United States Patent Office 3,792,022
Patented Feb. 12, 1974

3,792,022
PERFLUORO ADDITION POLYMERS
Robert J. Jones, Hermosa Beach, Calif., assignor to
TRW Inc., Redondo Beach, Calif.
No Drawing. Filed Oct. 27, 1972, Ser. No. 301,454
Int. Cl. C08g 22/00
U.S. Cl. 260—77.5 AM                9 Claims

ABSTRACT OF THE DISCLOSURE

Highly stable structural polymers are made by reacting a perfluoro vinyl containing reactant with difluoromaleic anhydride in the presence of a catalyst. These linear perfluoro polymers may be modified by including in the backbone chain a perfluoro compound having a pendant oxy structure. Further modification may be obtained by including amine terminated or diisocyanate terminated perfluoro cross-linking compounds. Polymerization by simple addition reaction is made to occur by the application of peroxide catalyst. These linear perfluoro polymers may be used for applications as seals, sealants, films, coatings, and fibers.

---

The invention herein was made in the course of or under a contract or subcontract thereunder (or grant) with the Department of the Air Force.

BACKGROUND OF THE INVENTION

Perfluoroinated polymers are widely used where applications require a high degree of stability with respect to heat and chemicals. Among the most widely known and used perhalogenated polymers are polytetrafluoroethylene and polytrichlorofluoroethylene. One of the disadvantages of these perhalogenated polymers, however, is their inherent cold growth and creep, especially when loads are applied.

U.S. 2,891,968 discloses a copolymer of styrene and difluoromaleic anhydride as an ingredient in formulations for finishes. Another prior art disclosure of difluoromaleic anhydride is found in U.S. 2,831,835 wherein a method of preparing difluoromaleic anhydride is disclosed.

SUMMARY OF THE INVENTION

High performance linear perfluoro polymers are made by reacting difluoromaleic anhydride with a perfluoronated olefinic compound. Polymerization occurs by an addition reaction through the olefinic unsaturation to form long halocarbon chains. The reaction may be illustrated as follows:

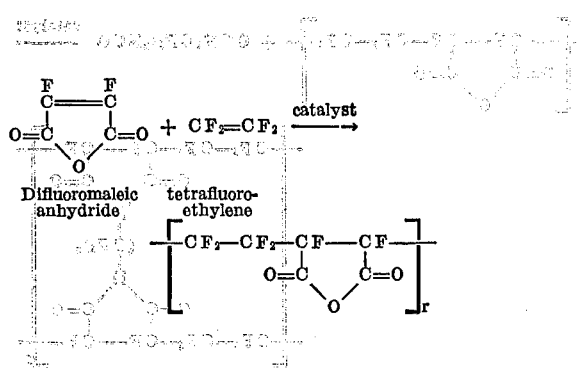

To obtain a broader range of properties, an olefinic perfluoro compound having pendant oxy groups may be included in the reactant so that the oxy compound will situate in the halocarbon backbone chain. This reaction may be illustrated as follows:

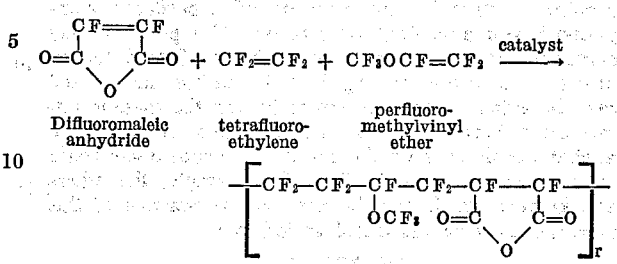

The most important modification may be achieved by the inclusion of a perfluoro diamine or a perfluorodiisocyanate terminated compound. These compounds react with the anhydride segment of the halocarbon backbone chain to provide an imide cross-link between the backbone chains. The reaction may be illustrated as follows:

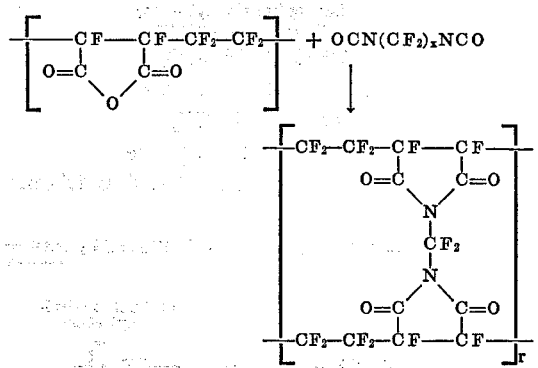

Polymerization occurs by placing the cooled reactants in an enclosed vessel and allowing the reactants to gradually warm. To complete the reaction, moderate heating may be applied during the latter period of the reaction. The polymerization is normally expedited by the use of an organic peroxide catalyst.

DESCRIPTION OF THE PREFERRED EMBODIMENTS

Addition reaction of a perfluoro olefinic compound with difluoromaleic anhydride produces a linear perfluoro polymer having outstanding chemical and thermal properties. The idealized reaction may be illustrated as follows:

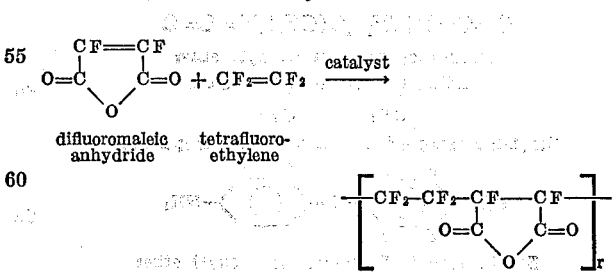

where $r$ is an integer from 60 to 4,000. Although tetrafluoroethylene is preferred for the perfluoro olefinic compound, other perfluoro alkylenes having 3 to 6 carbon atoms in their structure as well as perfluoro alkylene phenyls having 8 to 11 carbon atoms are within the contemplation of this invention. It is also contemplated that perfluoro alkylene isomers may be used.

The proportions of the reactants may be varied widely over a range of 1 to 50 mole percent for the difluoromaleic anhydride with the remainder comprising tetrafluoroethylene. Preferably, difluoromaleic anhydride is used in the range of 1 to 10 mole percent with the balance comprising the perfluoro alkylene.

Product properties of the perfluoro polymer may be modified further by the inclusion of a perfluoro compound having a pendant oxy structure. The perfluoro oxy compound may be either aliphatic having 3 to 6 carbon atoms or aromatic having 8 to 11 carbon atoms and may be either ketones or ethers having the olefinic unsaturation between the 1 and 2 carbon atoms of an aliphatic chain or the end carbons of the substituent chain on an aromatic radical. Thus, for example, the ethers and ketones which may be used in the practice of this invention may be illustrated as follows:

$$CF_3OCF=CF_2$$

Perfluoromethylvinyl ether

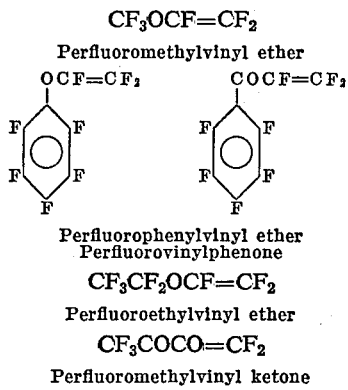

Perfluorophenylvinyl ether
Perfluorovinylphenone $$CF_3CF_2OCF=CF_2$$

Perfluoroethylvinyl ether $$CF_3COCO=CF_2$$

Perfluoromethylvinyl ketone

The idealized reaction may be illustrated as follows:

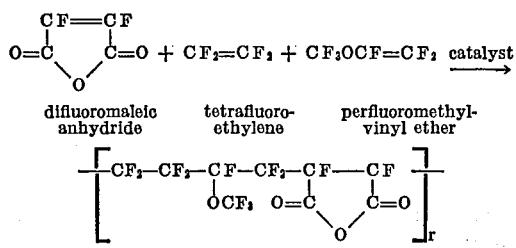

difluoromaleic anhydride   tetrafluoroethylene   perfluoromethylvinyl ether where $r$, again, is an integer from 60 to 4,000. A perfluoro oxy compound may be substituted in whole or in part for the tetrafluoroethylene constituent.

A key modification of the polymer properties may be effected by the inclusion of a perfluoro diamine or a perfluoro diisocyanate. The diisocyanates or the diamines act as a cross-linking agent, and react with the anhydride to form an interchain imide linkage. The cross-linking agents may have between 4 and 25 carbon atoms in their molecules. Some specific examples of suitable cross-linking agents are as follows:

$$O=C=N(CF_2)_2O(CF_2)_2N=C=O$$

Bis(2-isocyanoperfluoroethyl) ether $$O=C=NCFO(CF_2)_5OCFN=C=O$$
$$\quad\quad\quad CF_3 \quad\quad\quad CF_3$$

Bis(1-isocyanoperfluoroethoxy) perfluoropentane

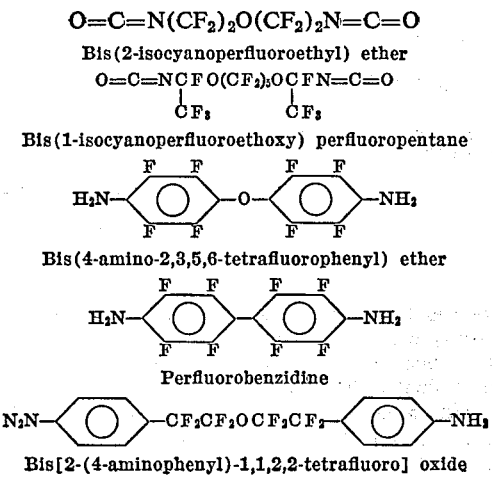

Bis(4-amino-2,3,5,6-tetrafluorophenyl) ether

Perfluorobenzidine

Bis[2-(4-aminophenyl)-1,1,2,2-tetrafluoro] oxide

In order to expedite the reaction of the perfluoro reactants, an organic peroxide in an amount up to about 5% by weight and preferably about 0.01% to 1% by weight is normally used. Specific examples of a few of the peroxide catalysts are as follows (1) Di-t-butyl peroxide
(2) 2,5-dimethyl-2,5-bis(tertiary butylperoxy)hexane
(3) n-Butyl-4,4-bis(tertiary butylperoxy) valerate
(4) 2,5-dimethyl-2,5-bis(tertiary butylperoxy) hexyne-3
(5) Tertiary-butyl perbenzoate
(6) Dicumyl peroxide
(7) Methyl ethyl ketone peroxide
(8) Cumene hydroperoxide
(9) Di-N-methyl-t-butyl percarbamate
(10) Lauroyl peroxide
(11) Acetyl peroxide
(12) Decanoyl peroxide
(13) t-Butyl peracetate
(14) t-Butyl peroxyisobutyrate When used in this invention, the peroxides are dissolved in a halogenated hydrocarbon, for example, dichloromethylene.

The polymerization process is carried out in a staged reaction sequence to suppress the tetrafluoroethylene difluoromaleic anhydride cyclic dimer reaction which would predominate if the entire polymerization were run at a moderate temperature. The polymerization may be performed in a temperature range of −20° C. to 120° C. Briefly, the procedure involves cooling the reactants to the solid state to remove any gaseous impurities. This may be most simply done by immersing the reactants in a vessel of liquid nitrogen. The reactants are placed in an evacuated reactor tube, and the tube is then sealed. A gradual warming of the contents of the reactor tube over a period of approximately 70 hours will produce a solid white copolymer.

If cross-linking of the copolymer is desired, the cross-linking agent is dissolved in a perfluorinated or chlorofluoroalkane and refluxed with the copolymer for 4 to 6 hours. The mixture is then placed in a vacuum oven and cured for 1 to 2 days at temperatures ranging from 40 to 60° C. In order to avoid unnecessary clean-up caused by an excess of the cross-linking agent, it is preferred that the mole amount of the cross-linking agent be equal to approximately one-half of the moles of anhydride used, that is, one equivalent of the cross-linking agent should be used for each equivalent of the anhydride. Generally, a slight excess of the cross-linking agent, usually 0.05 mole is employed to assure complete reaction of all the anhydrides. The cross-linking reaction may be illustrated as follows:

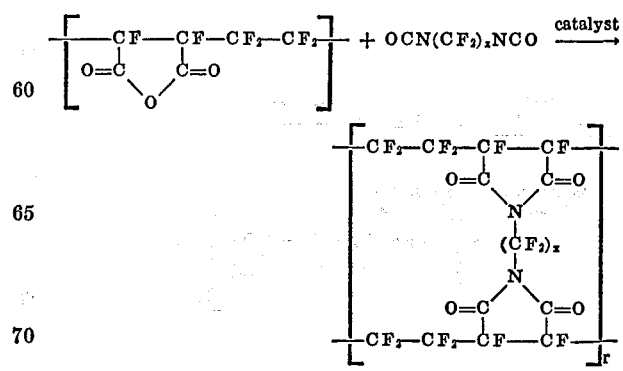

wherein $r$, again, is an integer from 60 to 4,000.

EXAMPLE I

Approximately 0.03 mole of tetrafluoroethylene was placed in a sealed container and immersed in liquid nitrogen until frozen solid. A Hoke tube was charged with 0.0045 mole of difluoromaleic anhydride, 10 ml. $CH_2Cl_2$ solvent and 1% by weight of lauroyl peroxide catalyst. The Hoke tube was sealed and evacuated. Next, the vessel containing the frozen tetrafluoroethylene was connected to the Hoke tube and upon warming the tetrafluoroethylene to the liquid phase, it transferred to the Hoke tube. The Hoke tube was sealed and gradually warmed to 50° C. Presusre in the Hoke tube at the start was 200 p.s.i., which during reaction decreased to 61%, or 122 p.s.i. A solid, off-white copolymer was recovered in 65% yield (2.3 gm.). The copolymer exhibited a melting point determined by differential scanning calorimeter at 311° C. The presence of anhydride in the copolymer was confirmed by infrared analysis (strong anhydride absorption at 1820 cm.$^{-1}$).

EXAMPLE II

Approximately 0.1 gm. of the copolymer prepared in Example I was refluxed with 0.04 gm. of a 700 molecular weight perfluoro diisocyanate dissolved in "Freon" 113 ($CCl_2FCClF_2$) for four hours. After refluxing the material was placed in a vacuum oven and heated for 24 hours at 50° C. Excess diisocyanate was removed by washing the cured copolymer with hot "Freon" 113. The infrared spectrum of the cured polymer showed a strong imide band at 1765 cm.$^{-1}$ and an absence of the 1820 cm.$^{-1}$ anhydride absorption. There were no infrared bands in the spectrum characteristic of unreacted isocyanate, urea, or amide. The cured material was insoluble in all common solvents.

We claim:

1. A perfluoro polymeric composition comprising

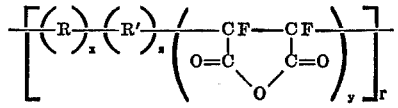

wherein R is selected from the group consisting of

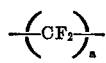

and isomers thereof wherein $a$ is an integer from 2 to 6; R' is a perfluoro radical having 3 to 6 carbon atoms when aliphatic and 8 to 11 carbon atoms when aromatic and containing a pendant oxy structure selected from the group consisting of ether and ketone; $x$ is a mole fraction equal to 0 or ranging from 0.5 to 0.99; $y$ is a mole fraction ranging from 0.01 to 0.5; $z$ is a mole fraction equal to 0 or ranging from 0.5 to 0.99 minus $x$, the sum of $x$, $y$, and $z$ comprising unity; and $r$ is an integer from 60 to 4,000.

2. A composition according to claim 1 wherein the polymeric chains are cross-linked with a perfluoro compound selected from the group consisting of perfluoro aromatic and perfluoro aliphatic diamines and diisocyanates in an amount which is stoichiometric with the anhydride.

3. A composition according to claim 1 wherein $x$ is a mole fraction ranging from 0.9 to 0.99 and $y$ is a mole fraction ranging from 0.1 to 0.01.

4. A composition according to claim 1 wherein $r$ is an integer ranging from 400 to 2100.

5. A composition according to claim 1 wherein R is tetrafluoroethylene.

6. A composition according to claim 1 wherein R is tetrafluoroethylene and R' is perfluoromethyl vinyl ether.

7. A composition according to claim 1 wherein R' is perfluoromethyl vinyl ether.

8. A composition according to claim 2 wherein the perfluoro compound is perfluoro diamino phenyl ether.

9. A composition according to claim 2 wherein the perfluoro compound is a perfluoro diisocyanoether having the structure:

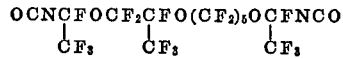

References Cited
UNITED STATES PATENTS 3,551,398　12/1970　Kometani et al. ___ 260—87.5 A
2,891,968　6/1959　Raasch _____ 260—78.5 R MAURICE J. WELSH, Primary Examiner U.S. Cl. X.R.

260—77.5 R, 78 R, 80.72, 87.5 A, 87.7

UNITED STATES PATENT OFFICE
CERTIFICATE OF CORRECTION

Patent No. 3,792,022              Dated February 12, 1974

Inventor(s) Robert J. Jones

It is certified that error appears in the above-identified patent and that said Letters Patent are hereby corrected as shown below:

Column 1, line 30 change "Perfluoroinated" to -- Perfluorinated --

Column 3, line 75 change "Bis[2-(4-aminophenyl)-1,1,2,2-tetrafluoro] to

-- Bis[2-(4-aminophenyl)-1,1,2,2-tetrafluoroethyl --

Column 5, line 15 change "Presusre" to -- Pressure --

Signed and sealed this 17th day of September 1974.

(SEAL)
Attest:

McCOY M. GIBSON JR.
Attesting Officer

C. MARSHALL DANN
Commissioner of Patents